United States Patent
Park

(10) Patent No.: US 9,010,505 B2
(45) Date of Patent: Apr. 21, 2015

(54) SHOCK ABSORBER

(71) Applicant: Mando Corporation, Gyeonggi-do (KR)

(72) Inventor: Wan Sang Park, Jeollabuk-do (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 64 days.

(21) Appl. No.: 13/644,245

(22) Filed: Oct. 3, 2012

(65) Prior Publication Data

US 2013/0161140 A1 Jun. 27, 2013

(30) Foreign Application Priority Data

Nov. 10, 2011 (KR) .................. 10-2011-0116738

(51) Int. Cl.
*F16F 9/34* (2006.01)
*F16F 9/49* (2006.01)
*F16F 9/58* (2006.01)

(52) U.S. Cl.
CPC .. *F16F 9/49* (2013.01); *F16F 9/585* (2013.01)

(58) Field of Classification Search
CPC ........... F16F 9/585; F16F 9/49; F16F 9/3485; F16F 9/516
USPC ............... 188/266, 284, 316, 322.15, 322.22; 267/35, 219
See application file for complete search history.

(56) References Cited

U.S. PATENT DOCUMENTS

| | | | |
|---|---|---|---|
| 4,254,849 A | 3/1981 | Pohlenz | |
| 4,345,748 A * | 8/1982 | Wossner et al. | 267/226 |
| 4,527,674 A * | 7/1985 | Mourray | 188/284 |
| 4,697,797 A * | 10/1987 | Gold | 267/64.24 |
| 4,934,667 A * | 6/1990 | Pees et al. | 267/64.21 |
| 4,953,671 A * | 9/1990 | Imaizumi | 188/282.3 |
| 5,193,655 A * | 3/1993 | Sasaki et al. | 188/282.4 |
| 5,293,971 A * | 3/1994 | Kanari et al. | 188/282.1 |
| 5,570,761 A * | 11/1996 | Paton | 188/271 |
| 5,667,041 A * | 9/1997 | Jensen | 188/284 |
| 6,626,274 B2 * | 9/2003 | Pfundstein et al. | 188/284 |
| 7,441,637 B2 * | 10/2008 | Fukushima et al. | 188/284 |
| 8,191,692 B2 * | 6/2012 | Mori et al. | 188/284 |
| 2005/0016805 A1 * | 1/2005 | Brehm et al. | 188/315 |
| 2013/0180814 A1 * | 7/2013 | LEE et al. | 188/313 |

FOREIGN PATENT DOCUMENTS

| | | |
|---|---|---|
| CN | 201447992 U | 5/2010 |
| FR | 2621663 A1 * | 4/1989 |
| GB | 2239073 A * | 6/1991 |
| JP | 04181038 A * | 6/1992 |
| JP | 2008-240764 A | 10/2008 |
| KR | 10-2002-0040313 A | 5/2002 |

OTHER PUBLICATIONS

Chinese Office Action issued in Chinese Application No. 201210434963.3 dated May 28, 2014.
Chinese Office Action issued in Chinese Application No. 201210434963.3 dated Nov. 17, 2014.

* cited by examiner

*Primary Examiner* — Bradley King
*Assistant Examiner* — Stephen Bowes
(74) *Attorney, Agent, or Firm* — McDermott Will & Emery LLP

(57) ABSTRACT

A shock absorber is provided. The shock absorber includes: a piston rod; an inner passage having an inlet port at an outer periphery of the piston rod; and a stopper installed at the outer periphery of the piston rod. The stopper is disposed to surround the inlet port of the inner passage, and an outer passage extending from an upper portion of the stopper to the inlet port is formed between the stopper and the piston rod.

3 Claims, 2 Drawing Sheets

SHOCK ABSORBER

CROSS-REFERENCE(S) TO RELATED APPLICATION

This application claims priority of Korean Patent Application No. 10-2011-116738, filed on Nov. 10, 2011, in the Korean Intellectual Property Office, which is hereby incorporated by reference in its entirety.

BACKGROUND OF THE INVENTION

1. Field of the Invention

The present invention relates to a shock absorber, and more particularly, to a shock absorber having an improved structure that is suitable for absorbing and dampening shock in full rebound in which a piston rod is maximally rebounded.

2. Description of the Related Art

Generally, a shock absorber for a vehicle is an anti-vibration and shock-absorbing apparatus that is installed between an axle and a vehicle body and improves a ride comfort by absorbing vibration or shock transferred from the axle during driving. A shock absorber is filled with gas or oil so as to increase a damping force. Typically, a hydraulic shock absorber filled with oil is widely used.

A shock absorber includes a cylinder, a piston, and a piston rod. The cylinder includes a working tube filled with a working fluid, such as oil. The piston is slidable within the working tube. The piston rod is connected to the piston and extends outward from the cylinder. The piston rod and the cylinder are connected to a vehicle body and an axle, respectively, and operate with a relative motion. The piston generates a damping force while operating with the working fluid by a valve structure provided therein.

Conventionally, a shock absorber, in which a stopper is installed in a piston rod, has been developed so as to prevent a piston from rapidly colliding against a rod guide, which slidably supports a piston rod, and absorb and dampen shock, in full rebound in which the piston rod is maximally rebounded.

SUMMARY OF THE INVENTION

In a structure of a conventional shock absorber with a stopper, a bypass passage may be formed within a piston rod. In this case, the stopper is installed while avoiding an inlet port of the bypass passage formed in the piston rod. This causes the increase in the basic length of the shock absorber because the length of the shock absorber is required to be further increased by a width or diameter of the inlet port of the bypass passage.

Therefore, as aspect of the present invention is directed to provide a shock absorber having an improved structure, in which a stopper is installed at a specific position of a piston rod where an inlet port of a bypass passage is formed, but the bypass passage can perform its function with reliability, in spite of the installation of the stopper.

According to another embodiment of the present invention, a shock absorber includes: a piston rod; an inner passage having an inlet port at an outer periphery of the piston rod; and a stopper installed at the outer periphery of the piston rod, wherein the stopper is disposed to surround the inlet port of the inner passage, and an outer passage extending from an upper portion of the stopper to the inlet port is formed between the stopper and the piston rod.

The stopper may include: an annular stopper rubber having an inner peripheral groove defining a gap between the piston rod and the stopper rubber; and a stopper body supporting a lower portion of the stopper rubber.

The stopper body may include: a lower bottom portion having a shaft hole into which the piston rod is fit; a wall portion formed upright on the lower bottom portion, such that the wall portion is spaced apart from the outer periphery of the piston rod; and a support portion extending radially from an upper end of the wall portion and supporting the stopper rubber.

<Description of Reference Numerals>

Figure 1:
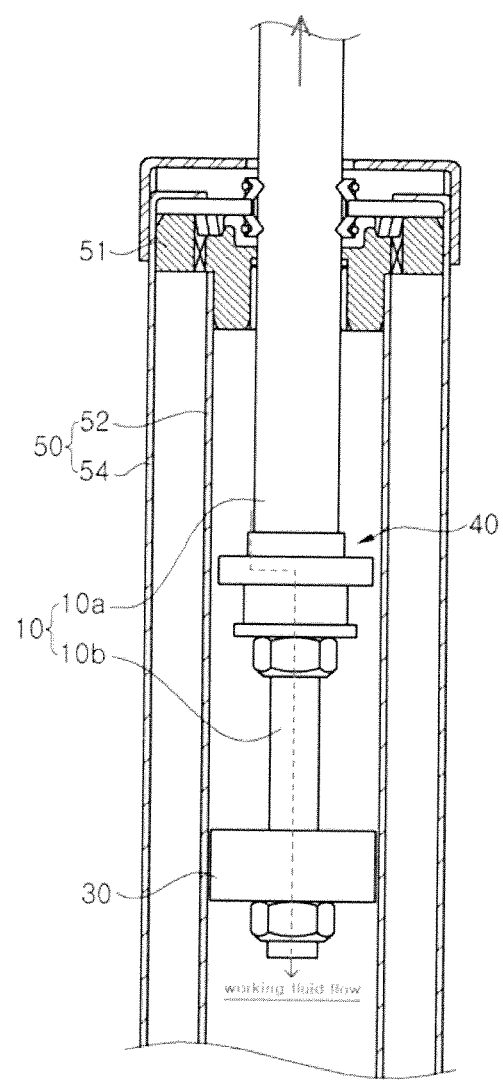
FIG. 1 is a cross-sectional view of a shock absorber according to an embodiment of the present invention.

| | |
|---|---|
| 10: piston rod | 10a: upper rod portion |
| 10b: lower rod portion | 12: inner passage |
| 121: inlet port | 122: hollow |
| 40: stopper | 41: stopper body |
| 42: stopper rubber | 423: inner peripheral groove |

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout this disclosure.

Figure 2:
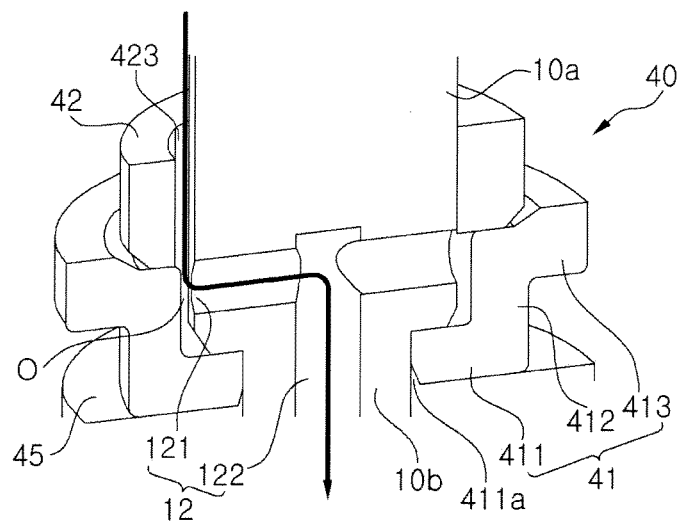
FIG. 2 is a cross-sectional view for describing a stopper of FIG. 1 in more detail.
Figure 3:
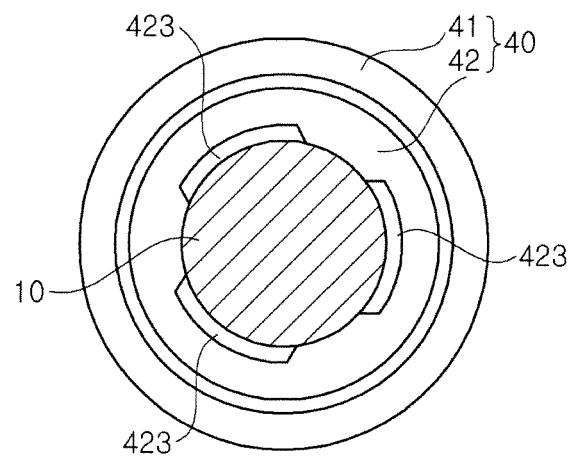
FIG. 3 is a plan view of the stopper inserted into a piston rod according to the embodiment of the present invention.

FIG. 1 is a cross-sectional view of a shock absorber according to an embodiment of the present invention. FIG. 2 is a cross-sectional view for describing a stopper of FIG. 1 in more detail. FIG. 3 is a plan view of the stopper inserted into a piston rod according to the embodiment of the present invention.

As shown in FIG. 1, the shock absorber according to the embodiment of the present invention includes a cylinder 50 having an inner tube 52 and an outer tube 54. In the case of a monotube type shock absorber, the outer tube may be omitted.

A rod guide 51 is installed in an upper end of the inner tube 52. Although not shown, a body valve may be installed in a lower end of the inner tube 52. The body valve allows a flow of a working fluid between a working chamber inside the inner tube 52 and a compensation chamber outside the inner tube 52, and generates a damping force according to the flow of the working fluid. It is apparent that the body valve may be omitted. Also, in the case of the monotube type shock absorber, the lower end of the inner tube 52 may be closed.

A piston rod 10 is slidably supported to the rod guide 51. A case where the length of the piston rod 10 rebounded to the outside of the shock absorber is longest is referred to as "full rebound". A piston 30 is installed in a lower portion of the piston rod 10. The piston 30 partitions the working chamber inside the inner tube 52 into a compression chamber and a rebound chamber. The volumes of the compression chamber and the rebound chamber are relatively increased or decreased according to a reciprocating motion of the piston rod 10.

The piston rod 10 includes an upper rod portion 10a and a lower rod portion 10b which have different diameters. Therefore, a height difference exists between the upper rod portion 10a and the lower rod portion 10b. A stopper 40 is fixed to the outer periphery of the piston rod 10. The stopper 40 may be fixed to the outer periphery of the piston rod 10 by using a bolt, a nut and/or a washer. In this embodiment, the stopper 40 is installed in the stepped portion between the upper rod portion 10a and the lower rod portion 10b.

As shown in FIGS. 2 and 3, the shock absorber according to the embodiment of the present invention includes an inner passage 12 for bypassing the working fluid through the inside of the piston rod 10. In this embodiment, the inner passage 12 includes a hollow 122 formed approximately vertically along a central axis line of the piston rod 10. In addition, the inner passage 12 has an inlet port 121 at the outer periphery of the upper rod portion 10a of the piston rod 10, and the inlet port 121 extends horizontally and connects to the hollow 122. Although not shown, an outlet port of the inner passage 12 may be formed at the outer periphery of the lower rod portion 10b of the piston rod 10 or the lower end of the lower rod portion 10b.

The stopper 40 is installed at the outer periphery of the piston rod 10 and surrounds the inlet port 121 of the inner passage 12. In this case, an outer passage O extending from the upper portion of the stopper 40 to the inlet port 121 is formed between the stopper 40 and the piston rod 10. An arrow of FIG. 2 indicates the flow of the working fluid flowing from the upper portion of the stopper 40 to the inlet port 121 through the outer passage O and then flowing through the inner passage 12 extending from the inlet port 121 through the hollow 122 to the outlet port (not shown).

Meanwhile, the stopper 40 includes a stopper rubber 42 having a substantially circular or tubular shape, and a stopper body 41 supporting the lower portion of the stopper rubber 42. The stopper rubber 42 is made of a rubber material having viscoelasticity so as to dampen shock when colliding against the rod guide 51 (see FIG. 1). In addition, the stopper rubber 42 includes a plurality of inner peripheral grooves 423 (see FIG. 3) having a substantially annular shape and defining a gap between the stopper rubber 42 and the piston rod 10. The plurality of inner peripheral grooves 423 may be formed at regular intervals. The stopper rubber 42 is assembled such that the inner peripheral portion, except for the inner peripheral groove 423, is fit to the outer periphery of the piston rod 10.

In addition, the stopper body 41 has a substantially cup shape with an opened upper portion. More specifically, the stopper body 41 integrally includes a lower bottom portion 411, a wall portion 412, and a support portion 413. The lower bottom portion 411 has a shaft hole into which the lower rod portion 10b of the piston rod 10 is fit. The wall portion 412 is formed to be upright in a vertical direction with respect to the lower bottom portion 411, such that the wall portion 412 is spaced apart from the outer periphery of the piston rod 10. The support portion 413 extends radially from the upper end of the wall portion 412 to the outside, and supports the stopper rubber 42. The inside of the support portion 413 is recessed relative to the edge thereof, and the stopper rubber 42 is mounted in the recessed region of the support portion 413.

Since the inner diameter of the wall portion 412 is larger than the outer diameter of the piston rod 10, a gap is formed between the wall portion 412 and the piston rod 10. The gap between the wall portion 412 and the piston rod 10 defines a lower portion of the above-described outer passage and directly faces the inlet port 121 of the inner passage 12. The lower bottom portion 411 is fit to the piston rod 10 to prevent the working fluid from directly flowing downward. Therefore, the working fluid flows through the inner passage 12, without deviating from the above-described outer passage.

The stopper body 41 may be made of steel or plastic having stiffness. The top surface of the lower bottom portion 411 of the stopper body 41 contacts the stepped surface between the upper rod portion 10a and the lower rod portion 10b. The bottom surface of the lower bottom portion 411 contacts a washer member 45 disposed under the lower bottom portion 411. In order to contact the washer member 45, the stopper 40 is tightly fixed to the piston rod 10 by a fastening member, which is coupled to the piston rod 10.

According to the embodiment of the present invention, since the stopper 40 is installed to cover the inlet port 121 of the inner passage, that is, the bypass passage, it is possible to avoid the unwanted increase in the basic length of the shock absorber. Therefore, although the stopper 40 is disposed at a position covering the inlet port 121 of the inner passage 12, the outer passage connected to the inlet port 121 exists between the stopper 40 and the piston rod 10. The outer passage allows the working fluid to be bypassed to another position through the inner passage inside the piston rod 10, without interference with the stopper 40.

While the embodiments of the present invention have been described with reference to the specific embodiments, it will be apparent to those skilled in the art that various changes and modifications may be made without departing from the spirit and scope of the invention as defined in the following claims.

What is claimed is:

1. A shock absorber comprising:
   a cylinder;
   a piston rod movably disposed within the cylinder;
   a stopper installed at an outer periphery of the piston rod;
   a flow passage defined between the stopper and the cylinder; and
   an inner passage formed in the piston rod, the inner passage having an inlet port at the outer periphery of the piston rod and an outlet port formed at a lower end of the piston rod and bypassing a working fluid through an inside of the piston rod,
   wherein the stopper is disposed to surround the inlet port of the inner passage, and an outer passage extending from an upper portion of the stopper to the inlet port is formed between the stopper and the piston rod,
   wherein the stopper comprises:
   an annular stopper rubber having an inner peripheral groove defining a gap between the piston rod and the stopper rubber; and
   a stopper body supporting a lower portion of the stopper rubber, and
   wherein the working fluid flows from the upper portion of the stopper to the inlet port through the outer passage and then flows through the inner passage extending from the inlet port to the outlet port.

2. The shock absorber according to claim 1, wherein the stopper body comprises:
   a lower bottom portion having a shaft hole into which the piston rod is fit;
   a wall portion formed upright on the lower bottom portion, such that the wall portion is spaced apart from the outer periphery of the piston rod; and
   a support portion extending radially from an upper end of the wall portion and supporting the stopper rubber.

3. The shock absorber according to claim 2, wherein:
the inner peripheral groove is plurally formed at an inner periphery of the stopper rubber;
inner peripheral portions of the stopper rubber, except for the inner peripheral groove, are fit to the outer periphery of the piston rod;
an inside of the support portion is recessed relative to an edge thereof;
the stopper rubber is mounted in the recessed region inside the support portion; and
a gap between the wall portion and the piston rod defines a lower portion of the outer passage, and directly faces the inlet port of the inner passage.

* * * * *